United States Patent [19]

Mellinger

[11] 4,450,784

[45] May 29, 1984

[54] HAND-CARRYABLE FLYING SAILBOAT

[75] Inventor: Ellis Mellinger, Hermosa Beach, Calif.

[73] Assignee: Llumar Star Kites, Pacoima, Calif.

[21] Appl. No.: 348,848

[22] Filed: Feb. 16, 1982

[51] Int. Cl.³ .............................................. B63H 9/04
[52] U.S. Cl. ........................................ 114/39; 114/61; 114/272; 244/153 R; 403/205
[58] Field of Search ...................... 403/205, 231, 403; 114/39, 56, 102, 273, 272, 291, 61; 244/153 R, 1 TD; D12/303, 304, 321; D21/88

[56] References Cited

U.S. PATENT DOCUMENTS

| | | | |
|---|---|---|---|
| 527,511 | 10/1894 | Rooke | 114/56 |
| 2,321,391 | 6/1943 | Kamin | 403/403 |
| 2,888,072 | 5/1959 | Nicholas | 403/205 X |
| 3,593,684 | 7/1971 | Cogliano | 114/61 |
| 3,796,175 | 3/1974 | Ford, Jr. | 114/61 |
| 3,877,406 | 4/1975 | Davis | 114/39 |

FOREIGN PATENT DOCUMENTS 2834923  2/1980  Fed. Rep. of Germany ........ 114/61

Primary Examiner—Sherman D. Basinger
Attorney, Agent, or Firm—Wagner & Bachand

[57] ABSTRACT

A hand-carryable flying sailboat for kite and water sports in which a lightweight rigid frame supports an airfoil-defining fabric stretched over the frame for flying and a sail assembly is carried dorsally by the frame and enables sail propulsion of the craft, whereby the craft can perform in the water or in the air, alternately and continually.

31 Claims, 9 Drawing Figures

U.S. Patent  May 29, 1984  Sheet 1 of 3  4,450,784
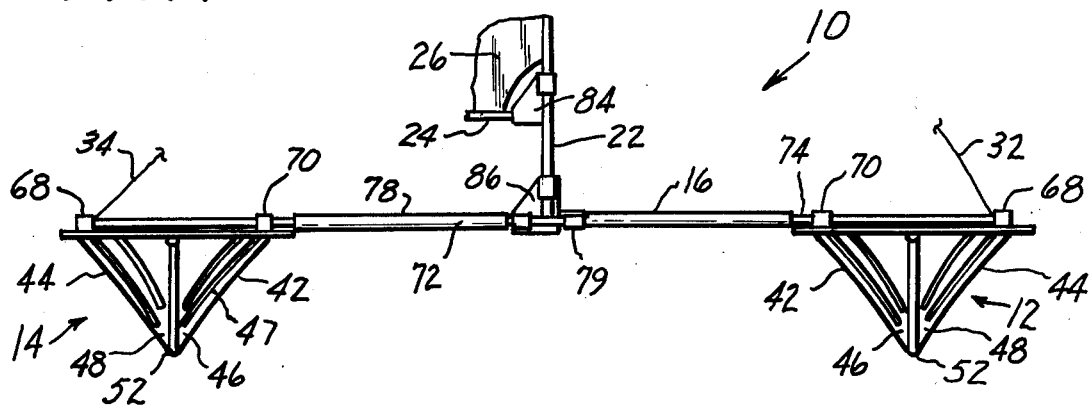
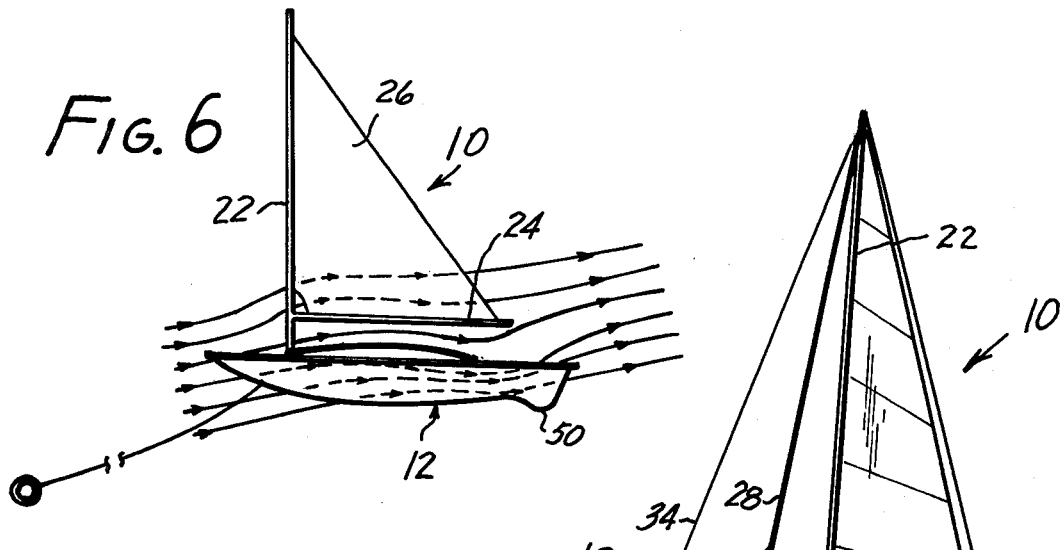
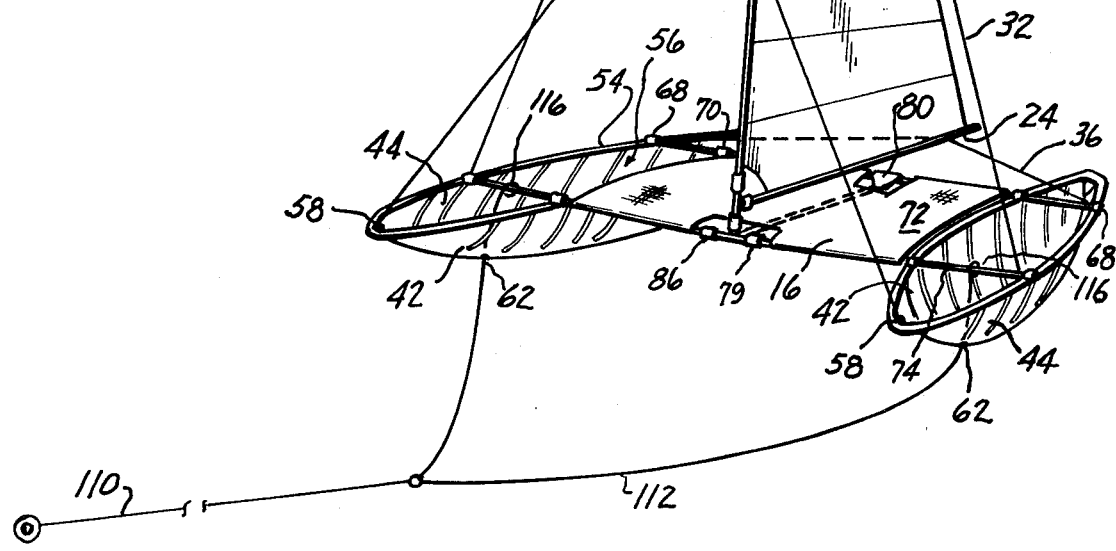

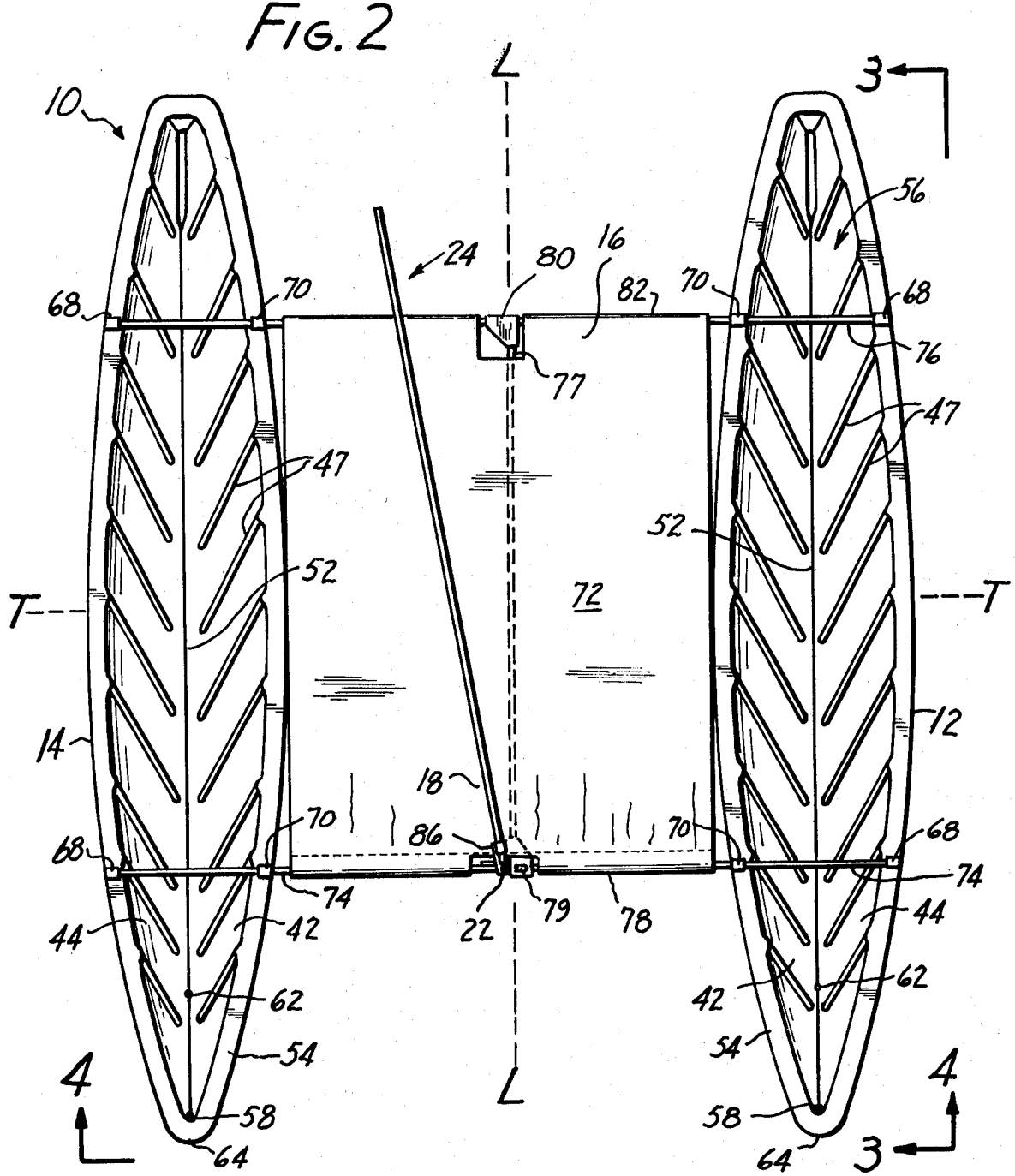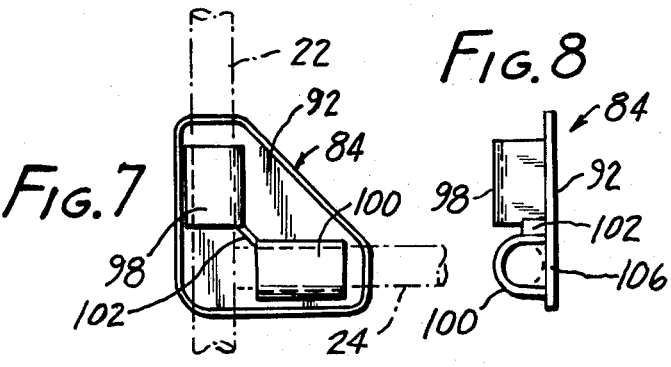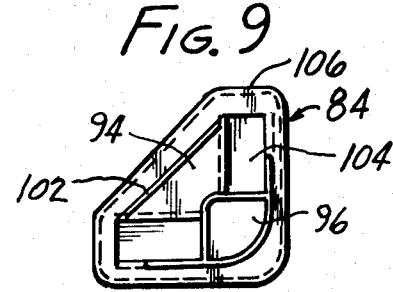

HAND-CARRYABLE FLYING SAILBOAT

TECHNICAL FIELD

This invention has to do with a game and sporting craft having the ability to fly in the air and sail on the water, and to do so alternately and continually. More particularly, the invention relates to a novel structure, part kite and part sailboat which creates an entirely new dimension in leisure pleasure, by combining the best attributes of model boat sailing and dramatic kite flying.

BACKGROUND ART

There have been numerous kites created and flown, and probably as many sailboats. To my knowledge, however, the presently disclosed hand-carryable flying sailboat is the first to combine model boat sailing and kite flying capability in a single structure.

DESCRIPTION OF THE INVENTION

It is an object of the invention to provide a novel hand-carryable flying sailboat. It is another object to provide an easy to launch, fast flying kite having excellent flying characteristics, and to provide a sailboat which emulates the fast sailing, easy handling characteristics of the cataraman-type sailboat, and more particularly to provide both of these in a single structure. It is a further object to provide a flying sailboat built of standardized parts which are easy to assembly and disassemble, low in manufacturing cost, lightweight and sturdy for good sailing and flying, and so designed as to disassemble in crash situations rather than to break.

In general, these objects are realized by utilizing a catamaran-type configuration in which the trampoline defines a lifting surface of sufficient capacity for flying while being side supported by the outrigger hulls, and in which the sail is taut and sized to permit stable flying, and to drive the boat in the water under even very light wind conditions, the balance of the apparatus being of lightweight, rigid construction amenable to flight or sailing.

These and other objects of the invention to become apparent hereinafter are realized in a novel structure of a hand-carryable flying sailboat for kite and water sports, comprising a rigid, lightweight frame defining a locus of bridle attachment and including port and starboard hull members and fore and aft crossbars extending therebetween, sheet material supported by the frame in lifting surface-defining relation, and an upright sail assembly cooperating with the frame means to maintain a lifting surface shape in the sheet material during flight in the air; the sail, frame, and sheet material being relatively proportioned in weight, shape and area such that the sailboat sails on water and flys in the air.

In particular embodiments, the invention provides a hand-carryable flying sailboat in which: the hull members comprise open-top hull-shaped floats of a length greater than the sheet material; the hull members terminate in rudder-shaped fins; the crossbars comprise lightweight, rigid dowels, the hull members defining opposed dowel retaining means, whereby the dowels are separably connectible to the hull members in parallel relation; the hull members comprise open-top hull-shaped plastic shells having upwardly divergent inner and outer walls, and include also means defining coaxial dowel-receiving apertures on the inner and outer walls, whereby a dowel end is connectible to a hull member at the apertures on both the inner and outer walls of the hull member; and the hull member inner and outer walls have in their outer surfaces series of parallel ribs formed therein at an acute angle to the horizontal.

In other embodiments of the invention, the relatively forward one of the crossbar dowels provides anchor points for a kite bridle, the hull members defining guides for the bridle forward of the anchor points; the lifting surface-defining sheet material comprises a tough flexible water-resistant fabric; this sheet material fabric is generally rectangular, and includes fore and aft edge margins respectively connected to the fore and aft crossbars, and free side edge margins; there is also included a longitudinal bar coupled to said crossbars defining the longitudinal distance therebetween, and the sheet material fabric is of greater longitudinal extent than the longitudinal distance between the crossbars along the longitudinal axis of the sailboat, whereby the sheet material fabric maintains an airfoil shape responsive to air flow thereover in sailboat flight; and the longitudinal extent of the sheet material is adjustable between the crossbars by partially rolling up the sheet material on a crossbar.

The invention further includes provision of crossbar retaining means on the hulls, the crossbars being separably retainable by the securing means in sheet material fabric unrolling blocking relation; and the fore and aft sheet material fabric edge margins defining crossbar dowel-receiving loops.

In still other embodiments according to the invention, the sail assembly comprises a mast at a right angle to the plane of the hull members and footed on the frame at the fore crossbar, a boom normal to the mast and overlying the sheet material, a sail stretched between the mast and boom, and stays extending upward from the hulls to support the mast in position in tension against the forward crossbar, whereby the fore crossbar is centrally slightly downwardly bowed at the leading edge of the lifting surface-defining sheet material in lifting characteristic enhancing relation; the sail comprises flexible water resistant fabric, the mast and boom are dowels, and including also means defining dowel-retaining apertures for securing the mast to the fore crossbar and the boom to the mast.

In a preferred embodiment of the invention, there is provided a hand-carryable flying sailboat for kite and water sports, comprising lifting surface-defining sheet material extending fore and aft and centered on and parallel with the sailboat longitudinal axis, frame means including transversely spaced longitudinally disposed port and starboard hull members, a longitudinal axial bar dowel, and longitudinally spaced, transversely disposed crossbars connecting said longitudinal dowel and said hull members for supporting the sheet material, and a vertically disposed, longitudinal axis aligned sail assembly including a sail adapted to drive the sailboat forward in water, and a mast, boom and stays supporting said sail and arranged to tension the frame means to maintain a lifting surface shape in the sheet material during flight in the air, the hull members having a weight, shape and relative spacing providing buoyancy keeping the sailboat afloat and aright while sailing in water, the sheet material lifting surface having an area and shape providing flying lift to the sailboat responsive to air flow over the sheet material.

In this embodiment, typically: the hull members comprise upwardly open synthetic organic plastic, hull-shaped floats located outboard of the sheet material in a lower parallel plane extending fore and aft of the sheet material; the crossbars and the longitudinal bar comprise lightweight, rigid dowels arranged in an H shape, the hull members defining opposed dowel retaining means, whereby the dowels are separably retainable on the hull members to separate upon crash impact preferentially to breaking of the hull members; the hull members have upwardly divergent inner and outer walls, and including also means defining dowel retainers on the inner and outer walls, whereby the crossbar dowel ends are retainable on the hull members; the inner and outer hull member walls have in their outer surfaces series of parallel ribs formed therein at an acute angle to the horizontal; there is further included a kite bridle, and the relatively forward of the crossbar dowels provides anchor points for a kite bridle, the hull members defining aperture guides for the bridle forward of the anchor points; the sheet material comprises a tough flexible water-resistant fabric; the sheet material fabric lies above the dowels, is generally rectangular, and includes fore and aft edge margins respectively connected to the fore and aft crossbar dowels, and free side edge margins; the sheet material fabric is of greater length than the longitudinal distance between the crossbar dowels, whereby the sheet material fabric maintains an airfoil shape responsive to air flow thereover in sailboat flight; the longitudinal extent of the sheet material fabric is adjustable between the crossbar dowels by partially rolling up the sheet material on a crossbar dowel; the crossbar dowel connections separably secure the crossbar dowel carrying the rolled up sheet material fabric in unrolling blocking relation; the fore and aft sheet material fabric edge margins define dowel receiving loops extending across substantially the width of the fabric edge; the sail assembly comprises a dowel mast at a right angle to the plane of the hull members, a right angle fitting footing the mast to the frame fore crossbar dowel, a dowel boom normal to the mast, a sail stretched between the mast and boom, and stays anchored by the crossbar dowel extending upward at the hull members supporting the mast in position in tension against the forward crossbar dowel whereby the forward crossbar dowel is centrally slightly downwardly bowed at the leading edge of the lifting surface-defining sheet material fabric to provide a dihedral in the forward section of the craft i.e. at the sheet material fabric and the hulls whereby the roll stability of the craft is enhanced, as in aircraft having a wing dihedral; the sail comprises flexible water resistant fabric, and including also brackets defining dowel-retainers for securing the mast to the crossbar and the boom to the mast.

The invention further provides brackets for retaining sailboat dowels securably for flight; the brackets typically comprise a generally planar triangular molded plastic web comprising apex-intersected dissimilar size triangles defining tubular sleeves which are open-walled in the plane of the web, and a side edge margin stiffening rib between the sleeve open wall and the web edge.

In a highly particularly preferred embodiment, the invention provides a hand-carryable flying sailboat for kite and water sports, comprising a lifting surface-defining sheet material fabric stretched between a pair of transversely disposed crossbar dowels and removably secured thereto by loops at the fore and aft edge margins of the fabric, a pair of formed plastic hulls having a deep V cross-section and upwardly diverging inner and outer walls, the hulls having opposed separately formed dowel retainers in coaxial relation with the dowels for securing the dowels separably to the hulls at the hull inner and outer walls, an axis-aligned longitudinal dowel bar coupled between the transversely disposed crossbar dowels, forming with said crossbar dowels and hulls a rigid frame structure with the lifting surface fabric centrally thereabove and in an elevated parallel plane relative to the plane of the hulls; a sail assembly adapted to drive the sailboat forward on the water and comprising an upright mast dowel, a boom dowel secured by a bracket normal to the mast, a separately formed right angle fitting securing the mast to the forward dowel, rigging tensioning the mast against the forward of the transversely disposed dowels in dowel downward deflecting, dihedral-defining relation, and a sail stretchedly secured to the mast and the boom for stability during flight; the hulls extending forwardly beyond the fabric and defining forward of the forward crossbar dowel a guide aperture for a kite bridle, the forward crossbar dowel defining port and starboard bridle anchor points on the respective hull centerlines.

THE DRAWINGS

The invention will be further described as to an illustrative embodiment in conjunction with the attached drawings in which:

FIG. 1 is a perspective view of the hand-carryable flying sailboat according to the invention;

FIG. 2 is a top plan view thereof, certain of the rigging being omitted for clarity of illustration;

FIG. 4 is a fragmentary front elevation view thereof taken on line 4—4 in FIG. 2;

FIG. 6 is side elevation view of the flying sailboat in flying mode, schematically illustrating typical air flow streams;

FIG. 7 is a top plan view of a dowel bracket according to the invention;

FIG. 8 is a side elevation view thereof, taken on line 8—8 in FIG. 3; and,

FIG. 9 is a bottom plan view thereof.

PREFERRED MODES

Figure 3:
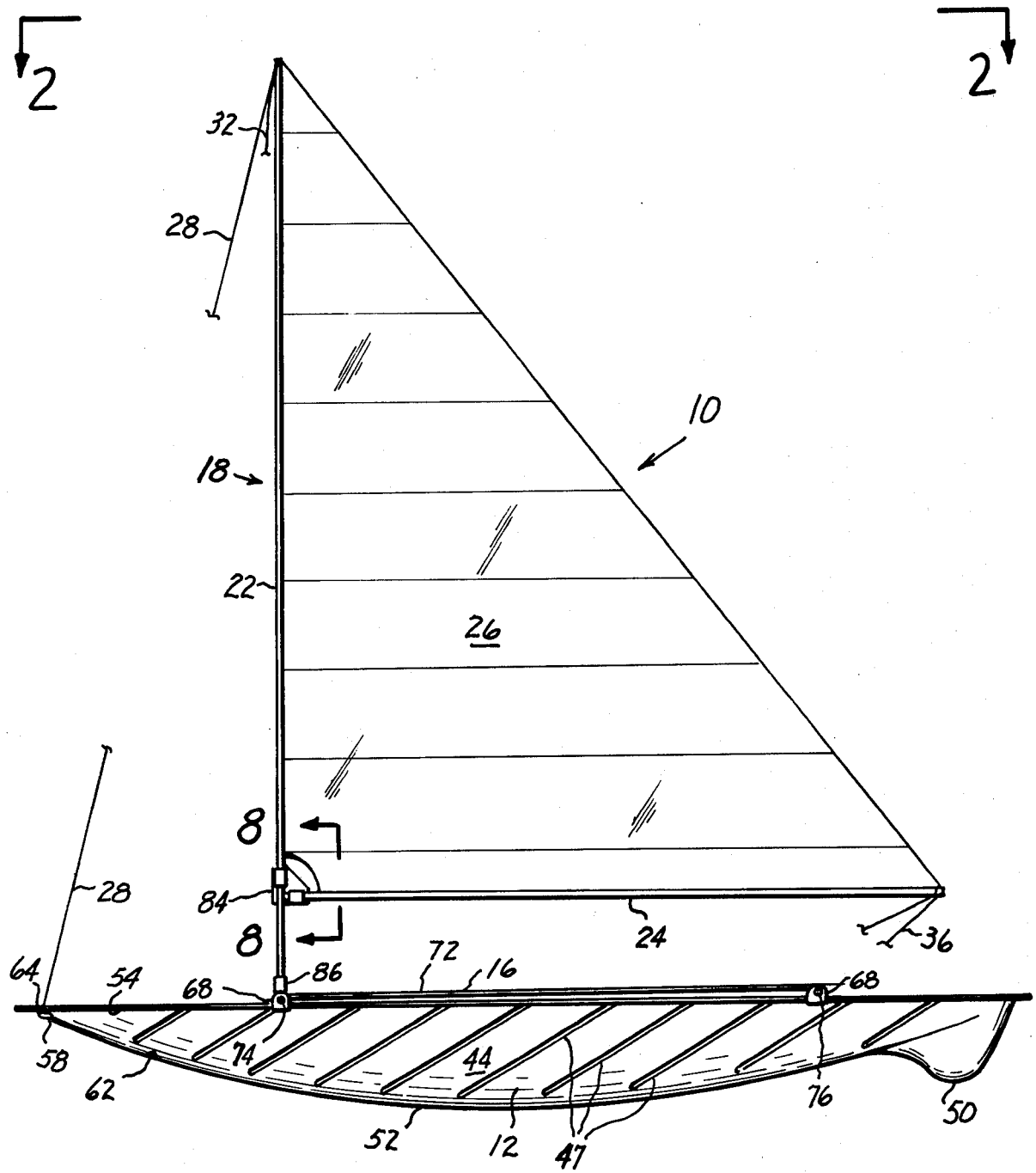
FIG. 3 is a side elevation view thereof taken on line 3—3 in FIG. 2.

Turning now the drawings in detail, the hand-carryable flying sailboat, shown at 10 in FIGS. 1-4, has a longitudinal axis L about which the craft is symmetrical, and a transverse axis T. The craft includes port and starboard hulls 12 and 14, a lifting surface-defining (see FIGS. 5 and 6) fabric trampoline 16, and a mast assembly 18 including the mast 22, the boom 24, the triangular sail 26, jib stay 28, port and starboard mast stays 32, 34, and boom stay line 36. All parts are easily assembled to provide a floating or flying craft for sailing and/or flying as desired.

The hulls 12, 14, are molded in tough synthetic organic plastic, such as rubber-modified polystyrene, to be rigid, but not brittle, lightweight and water impermeable. The port and starboard hulls 12, 14 are identical and will nest for storage and shipping; each comprising inner and outer walls 42, 44, joined by their lower edge margins 46, 48 at keel 52, and upwardly divergent and longitudinally oppositely bowed to form the open-topped hulls shown. Each hull 12, 14 terminates in a rudder fin 50. The hull inner and outer walls 42, 44 have parallel ribs 47 at a common acute angle to the horizontal to aid air flow and rigidify the walls between the keel 52 and the perimetrical flange 54 which surrounds the open top 56 of the hulls 12, 14.

The hulls 12, 14 are each provided with jib stay receiving eyelets 58 (see FIG. 2) or other means to secure the jib stay 28, and with bridle guide openings 62 rearwardly of the hull bows 64 but forwardly of the mast 22 as will be described hereinafter.

The hulls 12, 14 are further each provided with fore and aft sets of opposed, coaxial pairs of outboard and inboard dowel retainers 68, 70, respectively, for purposes of supporting the trampoline 16 comprising lift surface fabric material 72 which is durable, flexible, tough, water resistant and tear resistant. As shown in FIGS. 1-4, the trampoline 16 is stretched between the respective locus of the hulls 12, 14, and in a plane above the plane of the hulls, see FIGS. 3 and 4. To maintain the trampoline 16 in position, fore and aft dowels 74, 76 are provided, the trampoline fabric material 72 being provided with fore and aft loops 78, 82, respectively, for receiving the dowels.

Figure 5:
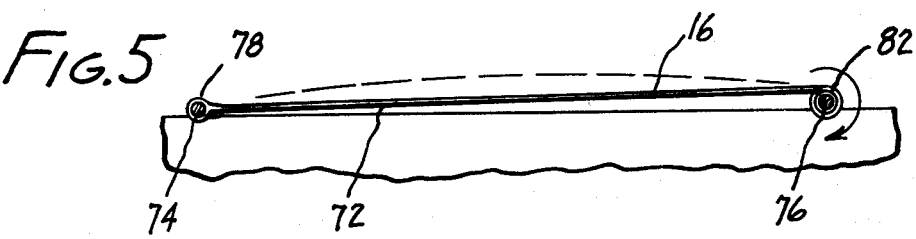
FIG. 5 is a detail view of the lifting surface fabric and dowel arrangement.

The dowel retainers 68, 70 are spaced along the longitudinal axis L of the sailboat 10 a distance slightly less than the length of the trampoline 16, so that the trampoline fabric material 72, as supported by loops 78, 82 over dowels 74, 76, is free to belly slightly, see FIG. 6, for airfoil-defining purposes, see also FIG. 5. It is a particular feature of the invention that the trampoline fabric 72 is length adjustable by rolling the fabric about dowel 76, see FIG. 5, more or less, to tauten as desired, and thus modify the airfoil shape, and lifting characteristics accordingly.

The dowels 74, 76 are mounted alike in the sets of retainers 68, 70. Thus the port dowel 74, 76 port ends are passed through inboard retainers 70, then into outboard retainers 68 which define socket-like pockets for the dowel ends. It will be immediately apparent that the assembly of the dowels 74, 76 in sets of retainers 68, 70 supports the hull walls 42, 44 in their alignment, stiffens the hulls 12, 14, and the dowels themselves, and provides a stiff anchorage fore and aft for the trampoline 16. A bar dowel 77 lies along the longitudinal axis L, coupled to the fore and aft crossbar dowels 74, 76 supported by brackets 79, 80. A rigid beam-like effect results from the assembly described.

It is further noteworthy that as assembled the dowels can be dislodged from their hull retention if the hulls 12, 14, are sufficiently flexed, as in a crash situation, preserving the integrity of the hulls and requiring only reassembly of the craft, thus preventing a loss thereof. This result is ensured by having the outboard retainers 68 sized to receive the dowels 74, 76 snugly when the dowel ends are overwrapped with rigging line. Thus, typically, the ends of dowels 74, 76 before being inserted in a retainer 68 has a thickness of rigging line, e.g. of mast stay 32, double overlaid thereon, suitably by forming a bight in the stay, inserting the dowel end in the bight and then pushing the stay and dowel end together into the retainer 70. This feature, in addition to enabling impact absorbing collapse in a crash, is useful for putting the proper tension in the rigging lines for desired support of the mast, as hereinafter explained.

The sail assembly 18 is mounted to the hull 12, 14-trampoline 16 arrangement just described. Proper tautness is important in the sail assembly. Unless the said 26 is sufficiently taut, achieved by drawing on the boom 24 with boom stay line 36 and the jib stay line 28 stability in flight is lessened. The boom 24 dowel and mast 22 dowel are inserted in respective loops which are formed at the shorter edges of the triangular sail 26. The boom 24 end at the mast 22 is inserted in a bracket 84 which has been previously slipped onto the mast.

The bracket 84, best shown in FIGS. 7-9, comprises a generally planar triangular molded plastic web 92 comprising apex-intersected dissimilar size triangles 94, 96 defining at right angles to each other tubular sleeves 98, 100 which are open-walled in the plane of the web, and a side edge margin stiffening rib 102 between the sleeve open wall 104 and the web edge 106.

The mast 22 is footed to the fore crossbar dowel 74 using a right angle fitting 86 which has been centered thereon before assembling to the hulls 12, 14.

Typically, the rigging is adjusted during assembly to locate the boom 24 at the longitudinal axis L for flying, or the same or different position for sailing as desired. This adjustment is made by wrapping the boom stay 36 ends onto the ends of aft crossbar dowel 76. The mast stays 32, 34 are similarly length-determined by attaching at the top of the mast and at the opposite end of the stay binding into the retainers 70 with the fore crossbar dowel 74. The jib stay 28 triangulated at 108 with one leg going to eyelet 58 on the port hull 12, and the other to eyelet 58 on the starboard hull 14. The several rigging lines and stays are tightened sufficiently to maintain the mast 22 in position, and somewhat more, until there is a downward deflection in the fore crossbar dowel 74, giving the dihedral configuration mentioned above, and tightening the sail 26 to a tautness effective for stabilizing the craft in flight.

For flying, a kite string 110 and bridle loop 112 is attached. For optimum flight angle, see FIG. 6, the bridle loop 112 is passed through port and starboard guide apertures 62 in the hulls 12, 14 and thence is secured at the hull centerlines to anchor points 116 on the fore crossbar dowel, see FIG. 1.

In flight, the trampoline 16 acts as a lifting surface, air passing over and under it along dissimilar length paths, creating lift, see FIG. 6 for a schematic representation of this flow. The rigging tension, as noted, slightly downwardly deflects the fore crossbar dowel 74 at the sailboat longitudinal axis L, for purposes mentioned. The degree of curvature of the trampoline 16 is adjustable, as mentioned, by shortening or lengthening the fabric material 72 by rolling or unrolling, respectively, on the aft crossbar dowel 76, between a taut, flat condition and a deep-bellied looseness having pronounced curvature, as depicted in FIG. 5 in solid and dashed lines respectively.

Thus, in accordance with the invention there is provided the first sail or fly craft in which the pleasures of model boating and kite flying are realizable together.

I claim:

1. Hand-carryable flying sailboat for kite and water sports, comprising a rigid, lightweight frame, kite string and bridle attachment means carried by said frame, and including port and starboard hull members and fore and aft crossbars extending therebetween, sheet material supported by said frame in lifting surface-defining relation, and an upright sail assembly cooperating with said frame means to maintain a lifting surface shape in said sheet material; said frame, sail and sheet material being relatively proportioned in weight, shape and area such that the sailboat sails on water and flys in the air for use as a kite.

2. Hand-carryable flying sailboat according to claim 1, in which said hull members comprise open-top hull-shaped floats of a length greater than said sheet material.

3. Hand-carryable flying sailboat according to claim 2, in which said hull members terminate in rudder-shaped fins.

4. Hand-carryable flying sailboat according to claim 1, in which said crossbars comprise lightweight, rigid dowels, said hull members defining opposed dowel retaining means, whereby said dowels are separably connectible to said hull members in parallel relation.

5. Hand-carryable flying sailboat according to claim 4, in which said hull members comprise open-top hull-shaped plastic shells having upwardly divergent inner and outer walls, and including also means defining coaxial dowel-retaining apertures on said inner and outer walls, whereby a dowel end is connectible to a hull member at said apertures at both the inner and outer walls of said hull member.

6. Hand-carryable flying sailboat according to claim 5, in which said hull member inner and outer walls have in their outer surfaces series of parallel ribs formed therein at an acute angle to the horizontal.

7. Hand-carryable flying sailboat for kite and water sports, comprising a rigid, lightweight frame defining a locus of bridle attachment and including port and starboard hull members and fore and aft dowel crossbars extending therebetween, the relatively forward of said cross bar dowels providing anchor points for a kite bridle, said hull members defining guides for said bridle forward of said anchor points, sheet material supported by said frame in lifting surface-defining relation, and an upright sail assembly cooperating with said frame means to maintain a lifting surface shape in said sheet material during flight in the air; said sail, frame and sheet material being relatively proportioned in weight, shape and area such that the sailboat sails on water and flys in the air.

8. Hand-carryable flying sailboat according to claim 1, in which said sheet material comprises a tough flexible water-resistant fabric.

9. Hand-carryable flying sailboat according to claim 8, in which said sheet material fabric is generally rectangular, and includes fore and aft edge margins respectively connected to said fore and aft crossbars, and free side edge margins.

10. Hand-carryable flying sailboat according to claim 9, including also a longitudinal bar coupled to said crossbars defining the longitudinal distance therebetween, and in which said sheet material fabric is of greater longitudinal extent than the longitudinal distance between said crossbars, whereby said sheet material fabric maintains an airfoil shape responsive to air flow thereover in sailboat flight.

11. Hand-carryable flying sailboat according to claim 10, in which the longitudinal extent of said sheet material is adjustable between said crossbars by partially rolling up said sheet material on a crossbar.

12. Hand-carryable flying sailboat according to claim 11, including also crossbar retaining means on said hulls, said crossbars being separably retainable by said retaining means in sheet material fabric unrolling blocking relation.

13. Hand-carryable flying sailboat according to claim 12, in which said fore and aft sheet material fabric edge margins define crossbar dowel-receiving loops.

14. Hand-carryable flying sailboat for kite and water sports, comprising a rigid, lightweight frame defining a locus of bridle attachment and including port and starboard hull members and fore and aft crossbars extending therebetween, sheet material supported by said frame in lifting surface-defining relation, and an upright sail assembly cooperating with said frame means to maintain a lifting surface shape in said sheet material; said frame, sail and sheet material being relatively proportioned in weight, shape and area such that the sailboat sails on water and flys in the air, and in which said sail assembly comprises a mast at right angle to the plane of said hull members and footed on said frame at said fore crossbar, a boom normal to the mast and overlying said sheet material, a sail stretched between said mast and boom, and stays extending upward from said hull members to support said mast in position in tension against said forward crossbar, whereby said fore crossbar is centrally slightly downwardly bowed at the leading edge of the lifting surface-defining sheet material in dihedral defining relation.

15. Hand-carryable flying sailboat according to claim 14, in which said sail comprises flexible water-resistant fabric, said mast and boom are dowels, and including also means defining dowel-retaining apertures for securing said mast to said fore crossbar and said boom to said mast.

16. Hand-carryable flying sailboat for kite and water sports, comprising lifting surface-defining sheet material extending fore and aft and centered on and parallel with the sailboat longitudinal axis, frame means including transversely spaced longitudinally disposed port and starboard hull members, a longitudinal axial bar dowel, and longitudinally spaced, transversely disposed crossbars connected to said longitudinal dowel and said hull members for supporting said sheet material, and a vertically disposed, longitudinal axis aligned sail assembly including a sail adapted to drive said sailboat forward in water, a mast, boom and stays supporting said sail and arranged to tension the frame means to centrally slightly downwardly bow the relatively forward of said crossbars to maintain a lifting surface shape in said sheet material during flight in the air, said hull members having a weight, shape and relative spacing providing buoyancy keeping said sailboat afloat and aright while sailing in water, said sheet material lifting surface having an area and shape providing flying lift to said said boat responsive to air flow over said sheet material.

17. Hand-carryable flying sailboat according to claim 16, in which said hull members comprise upwardly open synthetic organic plastic, hull-shaped floats located outboard of said sheet material in a lower parallel plane extended fore and aft of said sheet material.

18. Hand-carryable flying sailboat according to claim 17, in which said crossbars and said longitudinal bar comprise lightweight, rigid dowels arranged in an H shape, said hull members defining opposed dowel retaining means, whereby said dowels are separably retainable on said hull members to separate upon crash impact preferentially to breaking of the hull members.

19. Hand-carryable flying sailboat according to claim 18, in which said hull members have upwardly divergent inner and outer walls, and including also means defining dowel retainers on said inner and outer walls, whereby said crossbar dowel ends are retainable on said hull members.

20. Hand-carryable flying sailboat according to claim 19, in which said inner and outer hull member walls have in their outer surfaces series of parallel ribs formed therein at an acute angle to the horizontal.

21. Hand-carryable flying sailboat according to claim 19, including also a kite bridle, and in which the relatively forward one of said crossbar dowels provides anchor points for said kite bridle, said hull members defining guides for said bridle forward of said anchor points.

22. Hand-carryable flying sailboat according to claim 19, in which said lifting surface-defining sheet material comprises a tough flexible water-resistant fabric.

23. Hand-carryable flying sailboat according to claim 22, in which said sheet material fabric lies above said crossbar and longitudinal bar dowels, is generally rectangular, and includes fore and aft edge margins respectively connected to said fore and aft crossbar dowels, and free side edge margins.

24. Hand-carryable flying sailboat according to claim 23, in which said sheet material fabric is of greater length than the longitudinal distance between said crossbar dowels along the longitudinal axis of said sailboat, whereby said sheet material fabric maintains an airfoil shape responsive to air flow thereover in sailboat flight.

25. Hand-carryable flying sailboat according to claim 24, in which the longitudinal extent of the sheet material is adjustable between said crossbar dowels by partially rolling up said sheet material on one of said crossbar dowels.

26. Hand-carryable flying sailboat according to claim 25, including also crossbar securing means on said hulls, said crossbars being separably securable by the securing means in sheet material fabric unrolling blocking relation.

27. Hand-carryable flying sailboat according to claim 26, in which said fore and aft sheet material fabric edge margins define dowel receiving loops.

28. Hand-carryable flying sailboat according to claim 27, in which said sail assembly comprises a mast at a right angle to the plane of said hull members, a right angle footing said mast to said frame fore crossbar, a boom supported by a bracket normal to the mast, a sail stretched between said mast and boom, and stays extending upward from and anchored at said crossbar dowels at said hull members supporting said mast in position in tension against said forward crossbar, whereby said fore crossbar is centrally slightly downwardly bowed at the leading edge of said lifting surface-defining sheet material.

29. Hand-carryable flying sailboat according to claim 28, in which said sail comprises flexible water resistant fabric, said mast and boom are dowels, and including also brackets defining dowel retainers securing the mast to the crossbar and the boom to the mast.

30. The combination of a hand-carryable flying sailboat bracket and kite dowels, said bracket retaining said dowels securably for flight, said bracket comprising a generally planar, triangular perimeter, molded plastic web formed by plural, apex-intersected, dissimilar size triangles, tubular sleeves defined by said triangles to be open-walled in the plane of the web, said dowels being received in passing relation by said sleeves beyond the plane of said web and a side edge margin-stiffening rib between said sleeve open wall and said web perimeter.

31. Hand-carryable flying sailboat for kite and water sports, comprising a lifting surface-defining sheet material fabric stretched between a pair of transversely disposed dowels and removably secured thereto by loops at the fore and aft edge margins of said fabric, a pair of formed plastic hulls having a deep V cross-section and upwardly diverging inner and outer walls, said hulls having opposed separately formed dowel retainers in coaxial relation with said dowels for securing the dowels separably to the hulls at the hull inner and outer walls, a longitudinal axis aligned dowel bar coupled between said transversely disposed dowels and forming therewith and with said hulls a rigid frame structure with said lifting surface fabric centrally thereabove and in an elevated parallel plane relative to the plane of said hulls; a sail assembly adapted to drive the sailboat forward on the water and comprising an upright mast dowel, a boom dowel normal to said mast secured by a bracket, a separately formed right angle fitting securing said mast to said forward dowel, rigging tensioning said mast against the forward one of said transversely disposed dowels in dowel-downward-deflecting relation, and a sail stretchedly secured to said mast and boom; said hulls extending forwardly beyond said fabric and defining forward of said forward dowel a guide aperture for a kite bridle, said forward dowel defining port and starboard bridle anchor points on the hull centerlines respectively.

* * * * *